US012019531B2

(12) United States Patent
Wang et al.

(10) Patent No.: US 12,019,531 B2
(45) Date of Patent: Jun. 25, 2024

(54) NON-INTRUSIVE INTERACTION METHOD AND ELECTRONIC DEVICE

(71) Applicant: Huawei Device Co., Ltd., Guangdong (CN)

(72) Inventors: Jianfeng Wang, Dongguan (CN); Hao Chen, Dongguan (CN); Xiaoyun Yang, Dongguan (CN); Chi Guan, Nanjing (CN); Xiaoxiao Chen, Nanjing (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 186 days.

(21) Appl. No.: 17/688,025

(22) Filed: Mar. 7, 2022

(65) Prior Publication Data

US 2022/0188210 A1   Jun. 16, 2022

Related U.S. Application Data

(63) Continuation of application No. PCT/CN2020/110026, filed on Aug. 19, 2020.

(30) Foreign Application Priority Data

Sep. 5, 2019   (CN) .......................... 201910840922.6
Sep. 19, 2019  (CN) .......................... 201910886241.3

(51) Int. Cl.
  *G06F 11/30*   (2006.01)
  *G06F 8/35*    (2018.01)
  (Continued)

(52) U.S. Cl.
  CPC ............ *G06F 11/3096* (2013.01); *G06F 8/35* (2013.01); *G06F 8/36* (2013.01); *G06F 11/3075* (2013.01); *G06F 11/3604* (2013.01)

(58) Field of Classification Search
  CPC .......... G06F 11/3096; G06F 8/35; G06F 8/36; G06F 11/3075; G06F 11/3604
  (Continued)

(56) References Cited

U.S. PATENT DOCUMENTS

2011/0264754 A1* 10/2011 Gidugu ..................... G06F 8/36
                                                            709/206
2013/0305218 A1   11/2013 Hirsch et al.
  (Continued)

FOREIGN PATENT DOCUMENTS

CN       102854853 A       1/2013
CN       104657142 A       5/2015
  (Continued)

OTHER PUBLICATIONS

Yang et al, "Service components for managing the life-cycle of service compositions", 2004, [Online], pp. 97-125, [Retrieved from internet on Feb. 7, 2024], <chrome-extension://efaidnbmnn-nibpcajpcglclefindmkaj/https://pdf.sciencedirectassets.com/271528/1-s2.0-S0306437900X01688/1-s2.0-S0306437903000516> (Year: 2004).*

(Continued)

*Primary Examiner* — S. Sough
*Assistant Examiner* — Zengpu Wei
(74) *Attorney, Agent, or Firm* — Conley Rose, P.C.

(57) ABSTRACT

A non-intrusive interaction method includes an electronic device that obtains a description file of an application, where the description file indicates a function to be implemented by the application, and is defined using a non-intrusive protocol description; determines a first component based on the description file, where the first component is a component that is in components of the electronic device and that can implement the function that needs to be implemented by the application, and the component is configured based on a (Continued)

non-intrusive protocol to provide a device capability service and can implement an independent function; and runs, based on the description file to provide the device capability service for the application, the first component to implement the function.

20 Claims, 8 Drawing Sheets

(51) Int. Cl.
*G06F 8/36* (2018.01)
*G06F 11/36* (2006.01)

(58) Field of Classification Search
USPC .......................................................... 717/121

See application file for complete search history.

(56) References Cited

U.S. PATENT DOCUMENTS

| | | | |
|---|---|---|---|
| 2015/0242299 A1* | 8/2015 | Kumar | G06F 11/3452 718/107 |
| 2016/0085520 A1* | 3/2016 | Zhao | G06F 8/34 717/105 |
| 2017/0262263 A1* | 9/2017 | Zinn | G06F 8/60 |
| 2021/0064349 A1* | 3/2021 | Allgeier | G06F 8/36 |
| 2022/0188210 A1 | 6/2022 | Wang et al. | |

FOREIGN PATENT DOCUMENTS

| | | |
|---|---|---|
| CN | 109391676 A | 2/2019 |
| CN | 110955452 A | 4/2020 |

OTHER PUBLICATIONS

Qi Tielin, et al., "A Model Transformation Platform Design Based on Model Driven Architecture," May 11, 2010, XP031716210, 5 pages.

* cited by examiner

NON-INTRUSIVE INTERACTION METHOD AND ELECTRONIC DEVICE

This is a continuation of International Patent Application No. PCT/CN2020/110026 filed on Aug. 19, 2020, which claims priority to Chinese Patent Application No. 201910840922.6 filed on Sep. 5, 2019 and Chinese Patent Application No. 201910886241.3 filed on Sep. 19, 2019. All of the aforementioned patent applications are hereby incorporated by reference in their entireties.

TECHNICAL FIELD

This application relates to the field of electronic devices, and in particular, to a non-intrusive interaction method and an electronic device.

BACKGROUND

Electronic devices such as mobile phones have become indispensable communication tools in people's daily life and work. An application (APP) is installed in an electronic device, to improve functions of the electronic device, and provide richer use experience for a user. Implementation of some functions of the application relies on a device capability service provided by an operating system of the electronic device.

An intrusive interaction manner is used for interaction between an application and an operating system of an electronic device. Further, the operating system of the electronic device provides device capability services used to implement different functions, and provides corresponding functional interfaces for the application. The functional interfaces may be encapsulated into a software develop kit (SDK), which is referred to as a functional interface package. After integrating the functional interface package, the application may invoke a corresponding device capability service to implement a corresponding function.

This intrusive interaction manner has at least the following disadvantages. A device capability service cannot be invoked across operating systems. That is, if a functional interface package is implemented based on an operating system (for example, an ANDROID operating system), the functional interface package can only invoke a corresponding device capability service provided by the operating system, and cannot invoke a same device capability service provided by another operating system. A device capability service cannot be invoked across devices. That is, an application installed in an electronic device integrates a functional interface package, can invoke, by using the functional interface package, only a corresponding device capability service provided by an operating system of the electronic device, and cannot invoke a same device capability service provided by an operating system of another device. The application or the functional interface package needs to provide good compatibility. Otherwise, even if the application integrates the functional interface package, the application cannot invoke the corresponding device capability service. The operating system of the electronic device provides many types of device capability services and many corresponding functional interface packages. In other words, the functional interface packages are fragmented. This causes an application to integrate many functional interface packages.

SUMMARY

Embodiments of this application provide a non-intrusive interaction method and an electronic device. An application may invoke a device capability service in a non-intrusive interaction manner to implement a corresponding function, without integrating various functional interface packages. In addition, the device capability service may be invoked across operating systems and devices.

The following technical solutions are used in this application.

According to a first aspect, an embodiment of this application provides a non-intrusive interaction method. The method may be performed by an electronic device. The method may include that the electronic device obtains a description file of an application, where the description file is used to indicate a function that needs to be implemented by the application, and the description file is defined by using a non-intrusive protocol description, the electronic device determines a first component based on the description file, where the first component is a component that is in components of the electronic device and that can implement the function that needs to be implemented by the application, and the component of the electronic device is a module that is in the electronic device and that is configured based on a non-intrusive protocol to provide a device capability service, and can implement an independent function, and the electronic device runs the first component based on the description file to provide a device capability service for the application, to implement the function that needs to be implemented by the application.

By using the foregoing technical solution, after obtaining the description file that is of the application and that is defined by using the non-intrusive protocol description, the electronic device may determine, from the components of the electronic device based on the description file, the component that can implement the function that needs to be implemented by the application. The component of the electronic device is a module that is in the electronic device and that is configured based on a non-intrusive protocol to provide a device capability service, and can implement an independent function. The electronic device runs the determined component based on the description file to provide the device capability service for the application, to implement the function that needs to be implemented by the application. In this way, the application in the electronic device may invoke the device capability service in a non-intrusive interaction manner to implement a corresponding function. In addition, the device capability service may be invoked across operating systems and devices.

In a possible implementation, the description file includes an identification block and a logical block, and the identification block includes the following fields: a non-intrusive protocol version number followed by the description file, an identifier of the application, and a signature of the application. The logical block includes one or more single logical entities. A single logical entity in the logical block is used to indicate a running instance of a component, and the single logical entity in the logical block includes a head area. The head area includes a field used to identify a component that can implement the function that needs to be implemented by the application. That the electronic device determines a first component based on the description file may include that the electronic device checks normalization of the description file based on the fields included in the identification block of the description file and the field included in the head area, and when determining that the normalization check of the description file succeeds, the electronic device determines the first component based on the field included in the head area of the single logical entity in the logical block of the description file. In this way, a cross-device advantage of a descriptive language may be fully utilized by using the non-intrusive protocol description to generate the description file.

In another possible implementation, the single logical entity in the logical block further includes a body area, and the body area includes a field used for data required by a component to implement a function. That the electronic device runs the first component based on the description file to provide a device capability service for the application, to implement the function that needs to be implemented by the application may include that the electronic device runs the first component based on the field included in the body area of the single logical entity in the logical block of the description file to provide a device capability service for the application, to implement the function that needs to be implemented by the application.

In another possible implementation, that the electronic device obtains a description file of an application may include that the electronic device obtains the preconfigured description file in a non-run time of the application. The method may further include that the electronic device parses the description file, and stores the fields included in the identification block of the description file, the field included in the head area of the single logical entity in the logical block of the description file, and the field included in the body area of the single logical entity in the logical block of the description file. That the electronic device runs the first component based on the description file to provide a device capability service for the application, to implement the function that needs to be implemented by the application includes that the electronic device reads, in a run time of the application, the stored field included in the body area of the single logical entity in the logical block of the description file, and the electronic device parses the field included in the body area of the single logical entity in the logical block of the description file, and runs the first component based on a parsing result to provide a device capability service for the application, to implement the function that needs to be implemented by the application. The preconfigured description file is applicable to a scenario in which data required when a corresponding component provides a service does not vary with a running environment. For example, the preconfigured description file is applicable to an automatically started component. In this way, running efficiency of the component may be improved.

In another possible implementation, that the electronic device obtains a description file of an application may include that the electronic device generates the description file when the application is running. The method may further include that the electronic device parses the description file, and stores the fields included in the identification block of the description file, the field included in the head area of the single logical entity in the logical block of the description file, and the field included in the body area of the single logical entity in the logical block of the description file. That the electronic device runs the first component based on the description file to provide a device capability service for the application, to implement the function that needs to be implemented by the application may include that the electronic device reads the stored field included in the body area of the single logical entity in the logical block of the description file, and the electronic device parses the field included in the body area of the single logical entity in the logical block of the description file, and runs the first component based on a parsing result to provide a device capability service for the application, to implement the function that needs to be implemented by the application.

This process may be used to implement interaction of the description file in a scenario in which data required when a corresponding component provides a service varies with a running environment.

In another possible implementation, the electronic device stores configuration information of all components of the electronic device. That the electronic device determines a first component based on the description file may include that the electronic device determines the first component based on the description file and the stored configuration information of all components. The electronic device stores the configuration information of the components supported by the electronic device, so that a component that can provide a corresponding service may be found based on the description file, to provide the corresponding service for the application.

In another possible implementation, the electronic device further stores configuration information of all components of a device that establishes a wireless connection to the electronic device. The method may further include, if the electronic device does not determine the first component, and determines, based on stored configuration information of components, that there is a component that can implement the function that needs to be implemented by the application in the components of the device connected to the electronic device, the electronic device transmits the description file to the device connected to the electronic device, where the description file is used by the device connected to the electronic device to determine and run a corresponding component, to provide a device capability service for the application, and implement the function that needs to be implemented by the application. The electronic device may store configuration information of components of another electronic device connected to the electronic device. In this way, when the electronic device has no component that can provide the service for the application, the electronic device may send the description file to another device that can provide the corresponding service, thereby implementing cross-device capability service invocation.

According to a second aspect, an embodiment of this application provides an electronic device. The electronic device may include a processor and a memory. The processor and the memory are coupled, the memory is configured to store computer program code, and the computer program code includes computer software instructions. When the computer software instructions are executed by the electronic device, the electronic device is enabled to perform the following operations of obtaining a description file of an application, where the description file is used to indicate a function that needs to be implemented by the application, and the description file is defined by using a non-intrusive protocol description, determining a first component based on the description file, where the first component is a component that is in components of the electronic device and that can implement the function that needs to be implemented by the application, and the component of the electronic device is a module that is in the electronic device and that is configured based on a non-intrusive protocol to provide a device capability service, and can implement an independent function, and running the first component based on the description file to provide a device capability service for the application, to implement the function that needs to be implemented by the application.

In a possible implementation, the description file includes an identification block and a logical block, and the identification block includes the following fields: a non-intrusive protocol version number followed by the description file, an identifier of the application, and a signature of the application. The logical block includes one or more single logical entities. A single logical entity in the logical block is used to indicate a running instance of a component, and the single logical entity in the logical block includes a head area. The head area includes a field used to identify a component that can implement the function that needs to be implemented by the application. Determining a first component based on the description file includes checking normalization of the description file based on the fields included in the identification block of the description file and the field included in the head area, and when determining that the normalization check of the description file succeeds, determining the first component based on the field included in the head area of the single logical entity in the logical block of the description file.

In another possible implementation, the single logical entity in the logical block further includes a body area, and the body area includes a field used for data required by a component to implement a function. The running the first component based on the description file to provide a device capability service for the application, to implement the function that needs to be implemented by the application includes running the first component based on the field included in the body area of the single logical entity in the logical block of the description file to provide a device capability service for the application, to implement the function that needs to be implemented by the application.

In another possible implementation, obtaining a description file of an application includes obtaining the preconfigured description file in a non-run time of the application. When the computer software instructions are executed by the electronic device, the electronic device is enabled to further perform the following operations of parsing the description file, and storing the fields included in the identification block of the description file, the field included in the head area of the single logical entity in the logical block of the description file, and the field included in the body area of the single logical entity in the logical block of the description file. Running the first component based on the description file to provide a device capability service for the application, to implement the function that needs to be implemented by the application includes reading, in a run time of the application, the stored field included in the body area of the single logical entity in the logical block of the description file, and parsing the field included in the body area of the single logical entity in the logical block of the description file, and running the first component based on a parsing result to provide a device capability service for the application, to implement the function that needs to be implemented by the application.

In another possible implementation, obtaining a description file of an application includes generating the description file when the application is running. When the computer software instructions are executed by the electronic device, the electronic device is enabled to further perform the following operations of parsing the description file, and storing the fields included in the identification block of the description file, the field included in the head area of the single logical entity in the logical block of the description file, and the field included in the body area of the single logical entity in the logical block of the description file. Running the first component based on the description file to provide a device capability service for the application, to implement the function that needs to be implemented by the application includes reading the stored field included in the body area of the single logical entity in the logical block of the description file, and parsing the field included in the body area of the single logical entity in the logical block of the description file, and running the first component based on a parsing result to provide a device capability service for the application, to implement the function that needs to be implemented by the application.

In another possible implementation, the memory further stores configuration information of all components of the electronic device. Determining a first component based on the description file includes determining the first component based on the description file and the stored configuration information of all components.

In another possible implementation, the memory further stores configuration information of all components of a device that establishes a wireless connection to the electronic device. When the computer software instructions are executed by the electronic device, the electronic device is enabled to further perform the following operation, if the first component is not determined, and it is determined, based on stored configuration information of components, that there is a component that can implement the function that needs to be implemented by the application in the components of the device connected to the electronic device, transmitting the description file to the device connected to the electronic device, where the description file is used by the device connected to the electronic device to determine and run a corresponding component, to provide a device capability service for the application, and implement the function that needs to be implemented by the application.

According to a third aspect, an embodiment of this application provides a computer-readable storage medium, including computer software instructions. When the computer software instructions run on the electronic device, the electronic device is enabled to perform the non-intrusive interaction method according to any one of the first aspect or the possible implementations of the first aspect.

According to a fourth aspect, an embodiment of this application provides a computer program product. When the computer program product runs on a computer, the computer is enabled to perform the non-intrusive interaction method according to any one of the first aspect or the possible implementations of the first aspect.

According to a fifth aspect, an embodiment of this application provides a chip system. The chip system is used in an electronic device, and the chip system includes an interface circuit and a processor. The interface circuit and the processor are interconnected by using a line. The interface circuit is configured to receive a signal from a memory of the electronic device, and send the signal to the processor. The signal includes computer instructions stored in the memory. When the processor executes the computer instructions, the chip system performs the non-intrusive interaction method according to any one of the first aspect or the possible implementations of the first aspect.

According to a sixth aspect, an embodiment of this application provides an apparatus. The apparatus has a function of implementing behavior of the electronic device in the method in the first aspect. The function may be implemented by hardware, or may be implemented by corresponding software executed by hardware. The hardware or the software includes one or more modules corresponding to the foregoing function, for example, an obtaining unit or module, a determining unit or module, and a running unit or module.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to a same embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may be further identified in a specific embodiment that does not reflect all the embodiments.

DESCRIPTION OF EMBODIMENTS

Embodiments of this application provide a non-intrusive interaction method. The method may be performed by an electronic device including an application. By using the method, the application in the electronic device may invoke a device capability service in a non-intrusive interaction manner to implement a corresponding function. In addition, the device capability service may be invoked across operating systems and devices.

For example, the application in the embodiments of this application may be an embedded application (that is, a system application of the electronic device), or may be a downloadable application. The embedded application is an application provided as a part of implementation of the electronic device. The downloadable application is an application that may provide an Internet Protocol (IP) Multimedia Subsystem (IMS) connection of the downloadable application. The downloadable application may be an application preinstalled in the electronic device, or may be a third-party application downloaded and installed by a user in the electronic device.

For example, the electronic device in the embodiments of this application may be a device such as a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR)/ virtual reality (VR) device, or a media player. A specific form of the device is not limited in the embodiments of this application.

The following describes implementations of the embodiments of this application in detail with reference to the accompanying drawings.

Figure 1:
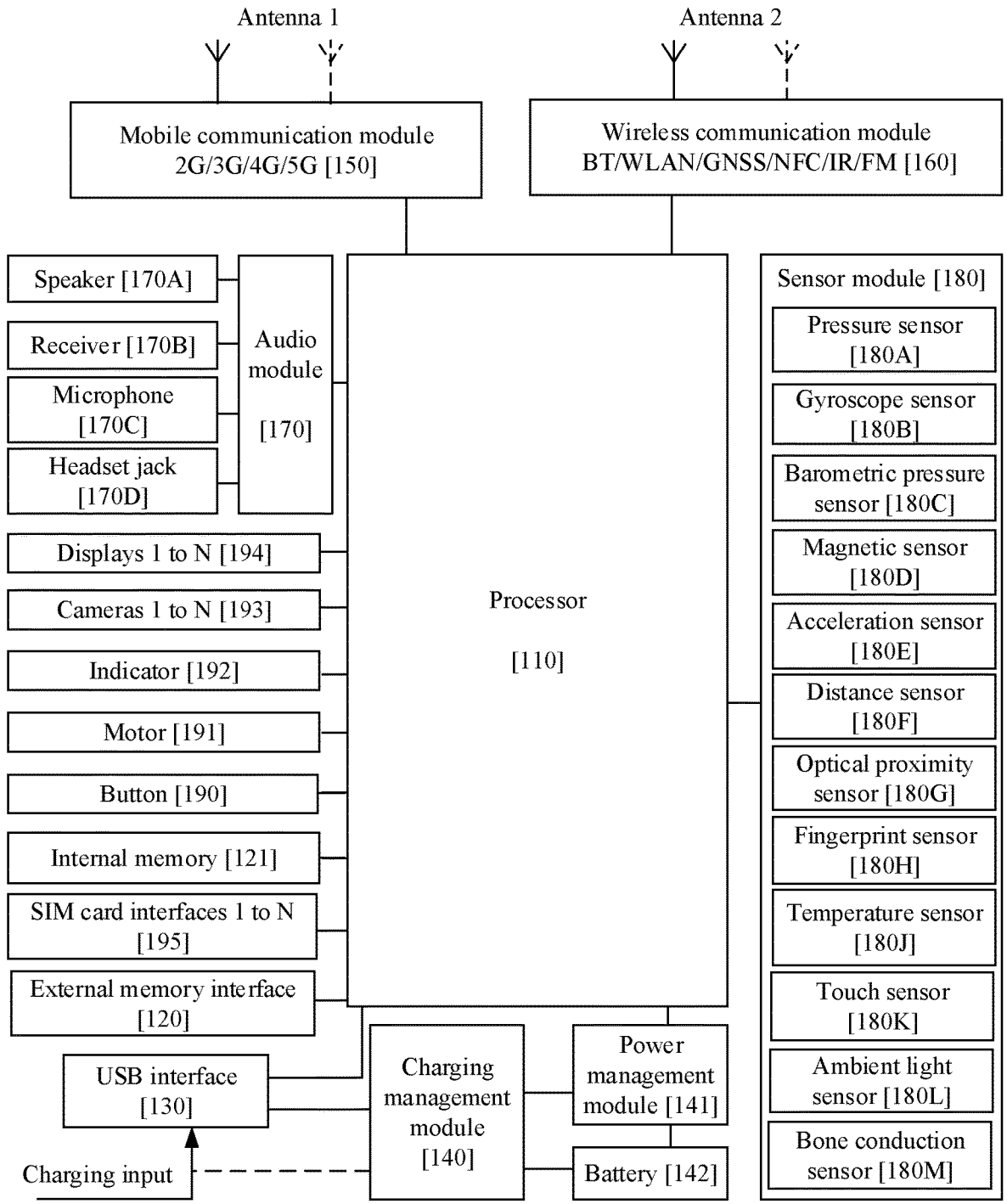
FIG. 1 is a schematic diagram of a structure of an electronic device according to an embodiment of this application.

FIG. 1 is a schematic diagram of a structure of an electronic device according to an embodiment of this application. As shown in FIG. 1, the electronic device may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device. The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache. The memory may store instructions or data that has just been used or is cyclically used by the processor 110.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a Mobile Industry Processor Interface (MIPI), a general-purpose input/output (GPIO) interface, an SIM interface, a USB interface, and/or the like.

The charging management module 140 is configured to receive a charging input from a charger. The charger may be a wireless charger or a wired charger. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed to improve antenna utilization.

The mobile communication module 150 may provide a solution that is for wireless communication including second generation (2G)/third generation (3G)/fourth generation (4G)/fifth generation (5G) and the like and that is used in the electronic device. The mobile communication module 150 may include at least one filter, a switch, a power amplifier, a low-noise amplifier (LNA), and the like. The mobile communication module 150 may receive an electromagnetic wave through the antenna 1, perform processing such as filtering and amplification on the received electromagnetic wave, and transfer a processed electromagnetic wave to the modem processor for demodulation. The mobile communication module 150 may further amplify a signal modulated by the modem processor, and convert the signal to an electromagnetic wave for radiation through the antenna 1. In some embodiments, at least some functional modules of the mobile communication module 150 may be disposed in the processor 110. In some embodiments, at least some functional modules in the mobile communication module 150 may be disposed in a same device as at least some modules in the processor 110.

In some embodiments, the modem processor may be an independent component. In some other embodiments, the modem processor may be independent of the processor 110, and is disposed in a same component as the mobile communication module 150 or another functional module.

The wireless communication module 160 may provide wireless communication solutions, used in the electronic device, for example, a wireless local area network (WLAN) (such as a WI-FI network), BLUETOOTH (BT), a global navigation satellite system (GNSS), frequency modulation (FM), a near-field communication (NFC) technology, and an infrared (IR) technology. The wireless communication module 160 may be one or more devices that integrate at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device is coupled to the mobile communication module 150, and the antenna 2 is coupled to the wireless communication module 160, so that the electronic device can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a GLONASS, a BEIDOU navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP is configured to process data fed back by the camera 193. In some embodiments, the ISP may be disposed in the camera 193.

The camera 193 is configured to capture a static image or a video. In some embodiments, the electronic device may include one or N cameras 193, where N is a positive integer greater than 1.

The digital signal processor is configured to process a digital signal, and may process another digital signal in addition to the digital image signal. The video codec is configured to compress or decompress a digital video. The NPU is a neural-network (NN) computing processor. The NPU quickly processes input information with reference to a structure of a biological neural network, for example, a transfer mode between human brain neurons, and may further continuously perform self-learning. An application such as intelligent cognition, for example, image recognition, facial recognition, speech recognition, or text understanding of the electronic device may be implemented by using the NPU.

The external memory interface 120 may be configured to connect to an external memory card, for example, a micro SD card, to extend a storage capability of the electronic device.

The internal memory 121 may be configured to store computer executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, an application required by at least one function (for example, a sound playing function or an image playing function), and the like. The data storage area may store data (such as audio data and a phone book) and the like created when the electronic device is used, and the like. In addition, the internal memory 121 may include a high-speed random-access memory (RAM), or may include a nonvolatile memory, for example, at least one magnetic disk storage device, a flash memory, or a Universal Flash Storage (UFS).

The electronic device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. The speaker 170A, also referred to as a horn, is configured to convert an audio electrical signal into a sound signal. The electronic device may listen to music or answer a hands-free call by using the speaker 170A. The receiver 170B, also referred to as an earpiece, is configured to convert an audio electrical signal into a sound signal. When a call is answered or voice information is received by using the electronic device, the receiver 170B may be put close to a human ear to receive a voice. The microphone 170C, also referred to as a mic or a mike, is configured to convert a sound signal into an electrical signal. At least one microphone 170C may be disposed in the electronic device. The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, for example, a resistive pressure sensor, an inductive pressure sensor, and a capacitive pressure sensor. The gyroscope sensor 180B may be configured to determine a motion posture of the electronic device.

The barometric pressure sensor 180C is configured to measure barometric pressure. In some embodiments, the electronic device calculates an altitude based on a barometric pressure value measured by the barometric pressure sensor 180C, to assist in positioning and navigation. The magnetic sensor 180D includes a Hall effect sensor. The electronic device may detect opening and closing of a flip cover by using the magnetic sensor 180D. The acceleration sensor 180E may detect magnitude of accelerations in various directions (usually on three axes) of the electronic device. The acceleration sensor 180E may be further configured to identify a posture of the electronic device. The distance sensor 180F is configured to measure a distance. The electronic device may measure the distance in an infrared or a laser manner.

The optical proximity sensor 180G may include an LED and an optical detector, for example, a photodiode. The electronic device emits infrared light through the LED. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device is in a pocket, to avoid an accidental touch.

The fingerprint sensor 180H is configured to collect a fingerprint. The electronic device may implement fingerprint-based unlocking, application lock access, fingerprint-based photographing, fingerprint-based call answering, and the like by using a feature of the collected fingerprint. The temperature sensor 180J is configured to detect a temperature. In some embodiments, the electronic device executes a temperature processing policy by using the temperature detected by the temperature sensor 180J.

The touch sensor 180K is also referred to as a touch panel. The touch sensor 180K may be disposed in the display 194, and the touch sensor 180K and the display 194 form a touchscreen, which is also referred to as a touch screen. The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device at a position different from that of the display 194.

The bone conduction sensor 180M may obtain a vibration signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The button 190 includes a power button, a volume button, and the like. The button 190 may be a mechanical button, or may be a touch button. The electronic device may receive a key input, and generate a key signal input related to user settings and function control of the electronic device.

The motor 191 may generate a vibration prompt. The motor 191 may be configured to produce an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted in the SIM card interface 195 or removed from the SIM card interface 195, to implement contact with or separation from the electronic device. The electronic device may support one or N SIM card interfaces, where N is a positive integer greater than 1.

The following embodiments may be implemented in an electronic device having the foregoing hardware structure.

In addition, a software system of the electronic device may use a layered architecture, an event-driven architecture, a microkernel architecture, a microservice architecture, or a cloud architecture. In the embodiments of this application, a software structure of the electronic device is described by using an ANDROID system with a layered architecture as an example.

Figure 2:
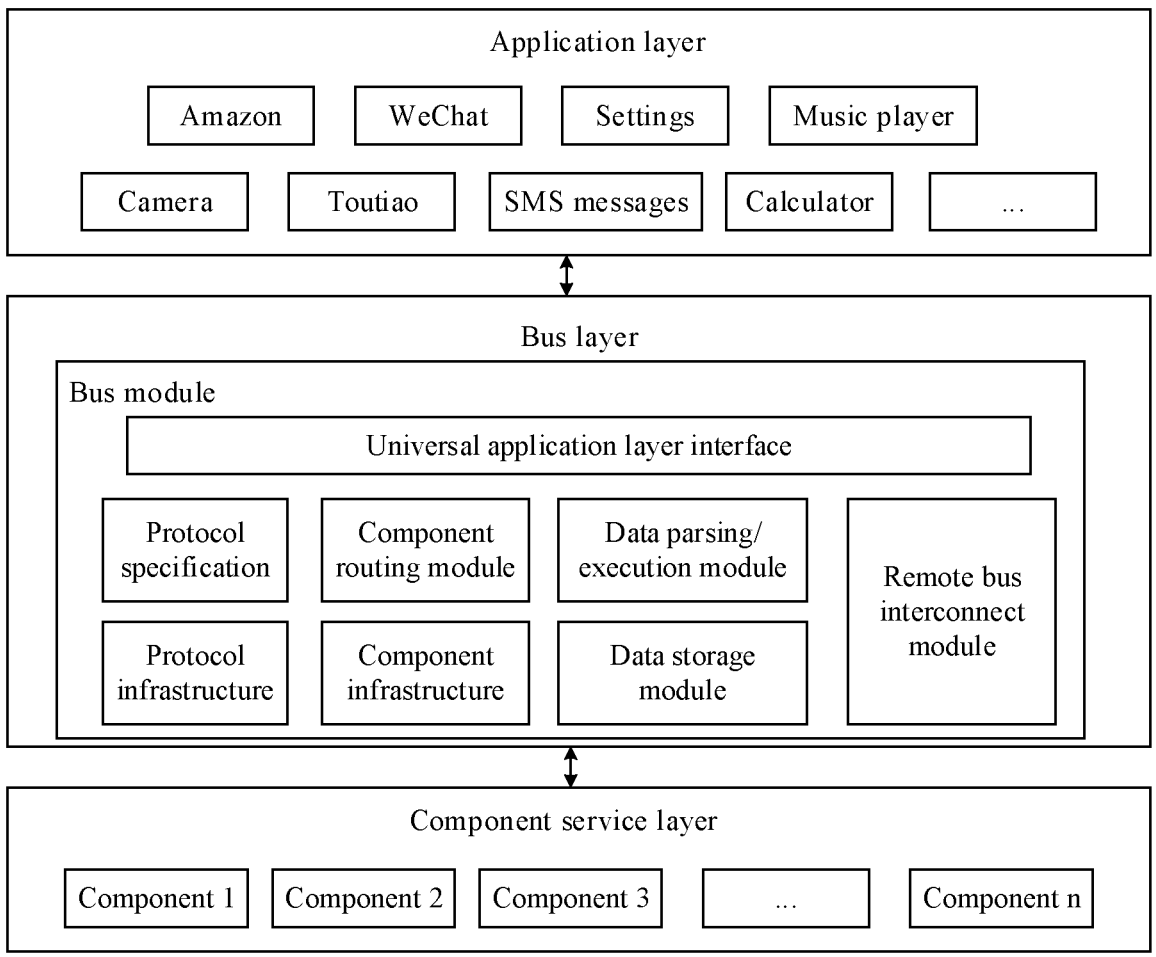
FIG. 2 is a schematic composition diagram of a software architecture of an electronic device according to an embodiment of this application.

FIG. 2 is a schematic composition diagram of a software architecture of an electronic device according to an embodiment of this application. In a layered architecture, software is divided into several layers, and each layer has a clear role and task. The layers communicate with each other through a software interface. In some embodiments, an ANDROID system is divided into three layers: an application layer, a bus layer, and a component service layer from top to bottom. Based on the software architecture, an application and an operating system may invoke a device capability service in a non-intrusive interaction manner. The software architecture may be used in a scenario in which a service provider and an application developer are separated on a plurality of devices.

The application layer may include a series of application packages. For example, the application packages may include applications such as AMAZON, WECHAT, settings, calculator, camera, TOUTIAO, Short Message Service (SMS) messages, and music player. In this embodiment, some functions of the applications need to be implemented by invoking a device capability service. When an application needs to invoke a device capability service to implement a corresponding function, the application may deliver a description file to the bus layer. The description file is used to indicate the function that needs to be implemented by the application.

The bus layer may include a bus module. The bus module is responsible for connecting an application at the application layer and a component at the component service layer. In this embodiment, the bus module may be configured to receive a description file of an application from the application layer. After the description file of the application from the application layer is received, the description file may be parsed, so that a corresponding component used to implement a function that needs to be implemented by the application is found from components of the component service layer based on the parsed description file. The found component is used to provide a device capability service for the application, to implement the corresponding function.

The component service layer may include a plurality of components, for example, a component 1, a component 2, a component 3, . . . , and a component n. Each component is a device capability service that can complete an independent function. Different components may provide a same device capability service or different device capability services. In this embodiment, after the bus module at the bus layer finds a corresponding component at the component service layer based on a description file delivered by an application at the application layer, the component at the component service layer may be started to provide a corresponding device capability service for the application, to implement a corresponding function. It should be noted that a carrying form of a component is not limited in this embodiment. For example, different components may be carried in different logical entities for implementation, and different components may alternatively be carried in one logical entity for implementation.

The following describes a description file delivered by an application at the application layer.

In some embodiments, the description file may be defined by using a non-intrusive protocol description, and is used to indicate a function that needs to be implemented by the application.

For example, the non-intrusive protocol description is a descriptive language used to support interaction between the application at the application layer and the bus module at the bus layer, so that a cross-device advantage of the descriptive language may be fully utilized.

For example, a JAVASCRIPT Object Notation (JSON) language may be used to define a structure of the description file. The JSON language is a lightweight data interchange format based on a JavaScript language.

The structure of the description file defined by using the JSON language may be as follows:

|—Identification block: including a universal identifier
|—Logical block: a logical entity when a component is running
   |—head (head): a fixed value (Key), used by the bus module at the bus layer to parse and check the description file
   |—body: a component-defined key, where the component at the component service layer parses this part to provide a corresponding service.

An example description file is as follows:

```
"hwEasyGoVersion":"1.0",                              //Version number of Huawei fast access protocol
"client":"com.ss.androd.article.news",                //Identifier of an accessed third-party
application
    "signInfo":"ALSJFS32KAD9OFJ2SAD9OFJ23",           //Signature
    "logicEntities":                                   //Logical block: running logical entities
{
  {
    "head":{                                           //Logical block: a head area, which is a universal key, where a head
check is performed before running
            "function":"denoising",
            "required":"ture",
            "hasNext":"false",
}
            "body": {
            "inpicture":"/xxx/20190408.jpg",
            "outpicture":"/xxx/20190408_d.jpg",
        }
    },
  {
    "head":{                                           //Logical block: a head area, which is a universal key, where a head
check is performed before running
            "function":"white",                        //Component name, which is unique in a
short period
            "required":"ture",
```

-continued

```
        "hasNext":"ture",                       //There is a serial function to be run
    }
    "body":{                                    //Logical block: a body area, which is a self-defined key and is
parsed by the component during running
        "inpicture":"/xxx/20190408.jpg",
        "outpicture":"tmp.yuv",
        "nextFunction":{                        //In a serial mode, a function is nested herein; in a
parallel mode, this is empty
            {
            "head": {
                "function":"thin",
                "required":"ture",
                "hasNext":"false",
            }
            "body": {
            "paraSource":"last",
            "paramName":"newPicturePath.xxx",   //Obtained from a
value returned in a previous step, where serialization is required
                "nextFunction":{
                }
            }
        }
      }
    }
  }
}.
```

In the foregoing example, EasyGoVersion indicates a non-intrusive protocol version number, client indicates an identifier of an application (or a client) that uses a non-intrusive protocol, signInfo indicates a signature of the application that uses the non-intrusive protocol, logicEntities indicates a logical entity set, head indicates a universal head area of a logical entity, body indicates a component-defined data area, function indicates a component, and required indicates whether a component needs to be executed.

The foregoing example description file follows a non-intrusive protocol version 1.0. The non-intrusive protocol version 1.0 may include fields in the foregoing example. In addition, the fields may be extended.

As shown in the foregoing example, the first to third lines are an identification block. It may be seen that the identification block includes universal fields such as a protocol version number, an application identifier, and an application signature.

Remaining lines are a logical block. The logical block is a logical entity when a component is running. The logical block may include one or more single logical entities. In this embodiment, a plurality of logical entities may be configured in parallel, and the plurality of logical entities may alternatively be configured in serial. In an example, a nesting manner may be used, and hasNext may be used to indicate whether the configuration is serial or parallel. For example, "hasNext":"false" is used to indicate that the configuration is parallel, that is, indicate that there is no serial component to be run, and "hasNext":"ture" is used to indicate that the configuration is serial, that is, indicate that there is a serial component to be run.

A single logical entity in the logical block represents a running instance of a component, that is, a component is invoked to provide a corresponding device capability service. A single logical entity includes a head area and a body area. The head area includes a component name, which may be, for example, indicated by function. The head area may further include other universal fields related to a component, for example, an identifier indicating whether the component needs to be executed (which may be, for example, indicated by required) and an identifier indicating whether there is a serial component to be run (which may be, for example, indicated by hasNext). For another example, the head area may further include an identifier of a specific component to be used (which may be, for example, indicated by parameter, and is not shown in the foregoing example). When a plurality of components can provide a device capability service corresponding to a function to be used by an application, the identifier may be used to match a specific component to be used by the application. The body area includes a component-defined field (or a component-defined key). Data included in the body area is related to a function (or a service) that the component can complete.

The application at the application layer may invoke a corresponding component by delivering the description file using the non-intrusive protocol description to the bus module at the bus layer.

The following describes the bus module at the bus layer.

Further referring to FIG. 2, the bus module may include a universal application layer interface, a protocol specification, a protocol infrastructure, a component infrastructure, a component routing module, a data parsing/execution module, a data storage module, and a remote bus interconnect module.

The universal application layer interface may be implemented by using a universal PostData interface. The application at the application layer may transmit the description file to the bus module at the bus layer by using the universal application layer interface.

The protocol infrastructure may be responsible for implementing a basic data structure of a non-intrusive protocol. The basic data structure is a standard format of a non-intrusive protocol, including classes of an identification block and a logical block, a data structure of a standard key of the identification block, and a data structure of a standard key of the logical block. The protocol specification may be responsible for providing specific data and logic specifications for a non-intrusive protocol. The protocol specification can further provide a normalization check function for a description file delivered by an application at the application layer. Normalization of the description file may be checked based on the protocol infrastructure and the protocol specification. For example, a protocol version number, a client identifier, a signature, and a function in the description file may be checked, to check normalization of the description file. For example, when the protocol version number, the client identifier, the signature, and the function in the description file are not empty, it is determined that the check of the description file succeeds. When the function is checked, an invalid space in corresponding data may be removed, a case of the data may be ignored, and the data may be converted to be all in lowercase.

The component infrastructure defines a basic element of a component at the component service layer, such as an action and meta-data mechanism. The action and meta-data mechanism is described in the following component description.

The data parsing/execution module may be configured to parse/check a description file from an application at the application layer based on the protocol specification and the protocol infrastructure. The data parsing/execution module may be further configured to start corresponding execution logic based on the protocol specification and a serial or parallel configuration of logical entities in the description file. If the logical entities in the description file are configured in serial, serial logic is executed, that is, components are run in serial. If the logical entities in the description file are configured in parallel, parallel logic is executed, that is, the components are run in parallel. The data parsing/execution module is connected to the component routing module and the data storage module. For example, after parsing the description file, the data parsing/execution module may transmit a corresponding parsing result to the component routing module and/or the data storage module.

The component routing module is configured to implement a function of finding a corresponding component from components at the component service layer based on the description file from the application at the application layer application. For example, the component routing module may search for a corresponding component based on the parsing result of the description file from the data parsing/execution module, and indicate the component to provide a corresponding device capability service for the application. The component routing module may further provide, for a component, a function of querying component-defined data (for example, data included in the body area).

The data storage module is responsible for storing the parsing result of the description file.

The remote bus interconnect module may be connected to a bus module at a bus layer of another device by using a network. The remote bus interconnect module may be further configured to transmit a description file from an application at the application layer. For example, the remote bus interconnect module may transmit the description file from the application at the application layer to a bus module of another device having a corresponding component.

The following describes the components at the component service layer.

As described above, a component is a module that provides a device capability service, and can implement an independent function. The component has at least the following three features:

Feature 1: The component can parse component-defined data provided by a non-intrusive protocol.

Feature 2: The component has independent configuration information. For example, in a logical entity that carries the component, configuration information of the component may be added in the following format (for example, the format may be referred to as an action and meta-data mechanism):

```
<action name="com.support.component"/>
<meta-data name="com.support.component1" value="function1"/>
<meta-data name="com.support.component2" value="function2"/>.
```

In the configuration information, the first line is used to indicate that the following components are components that support the non-intrusive protocol. The second and third lines respectively indicate functions implemented by different components.

For example, the electronic device can provide a video playing service and a video uploading service for the application. In this case, in logical entities that carry a corresponding video playing component and a corresponding video uploading component, configuration information of the corresponding video playing component and the corresponding video uploading component may be added based on the following format:

```
<action name="com.support.component"/>
<meta-data name="com.support.component1" value="videoPlay"/>
<meta-data name="com.support.component2" value="videoUpload"/>.
```

In the configuration information, the second line is used to indicate that a function implemented by the component is video playing, that is, the video playing service may be provided for the application. The third line is used to indicate that a function implemented by the component is video uploading, that is, the video uploading service may be provided for the application.

Feature 3: The component includes an interface for implementing interaction with the bus module. In some embodiments, a universal PostData interface may be used for implementation. For example, the interface is PostData(json easygo).

Based on the software architecture provided in FIG. 2, the application at the application layer in the electronic device uses the non-intrusive interaction manner, that is, delivers the description file used to indicate the function that needs to be implemented by the application to the bus module at the bus layer, so that the bus module may find, from the components at the component service layer based on the description file, the corresponding component used for the corresponding function. After being started, the found component may provide the corresponding device capability service for the application, to implement the corresponding function.

In this embodiment, the non-intrusive interaction manner based on the foregoing software architecture may be classified into static interaction and runtime interaction.

Static interaction may mean that in a non-run time of the application, or before the application needs to use a service provided by the component, the application completes interaction with the bus module at the bus layer for a description file used to indicate some functions that need to be implemented by the application. When a corresponding function needs to be implemented in a run time of the application, a corresponding component may directly provide a corresponding device capability service for the application based on an interaction result completed in advance, to implement the corresponding function. An interaction manner of static interaction is applicable to an automatically started component. The automatically started component is a component that is automatically started when the electronic device is powered on, for example, a component that provides an interface adaptation service. Data required when the automatically started component provides a corresponding service does not vary with a running environment. The non-run time of the application may include a period such as an installation period of the application.

Runtime interaction may mean that in a run time of the application, the application completes interaction with the bus module at the bus layer for a description file used to indicate some functions that need to be implemented by the application, and provides a corresponding device capability service for the application based on an interaction result, to implement a corresponding function. An interaction manner of runtime interaction is applicable to a component whose data used when providing a corresponding service changes at any time in the run time of the application. Therefore, when the application needs the component to provide a service, the application performs data interaction with the bus module at the bus layer.

The following separately describes static interaction and runtime interaction.

An example in which the non-run time of the application is the installation period of the application is used. With reference to FIG. 2, referring to FIG. 3, an interaction process of static interaction is as follows.

Figure 3:
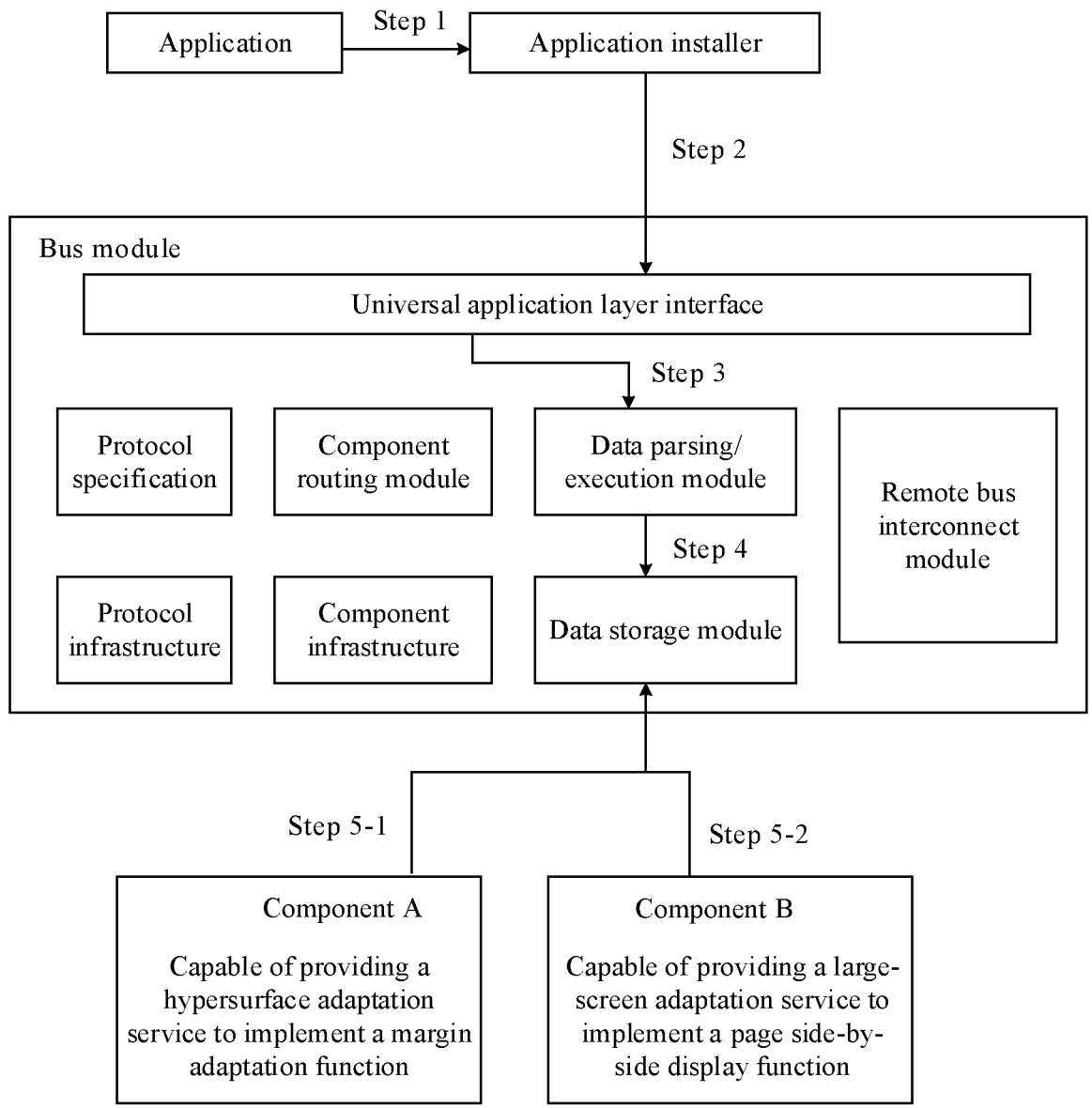
FIG. 3 is a schematic flowchart of non-intrusive interaction according to an embodiment of this application.

When the application is installed, an application installer reads the description file of the application (that is, performs step 1 in FIG. 3), and invokes the universal application layer interface of the bus module at the bus layer, such as the PostData interface, to transmit the read description file to the bus module (that is, performs step 2 in FIG. 3). The application installer is a software module responsible for application installation. The application installer may be responsible for parsing an application configuration, decompressing an application package, and solidifying an application file into an application installation directory. The description file is configured by an application developer based on a function that needs to be implemented by the application, and packaged into an installation package of the application. The function may include a function implemented by invoking a device capability service provided by an automatically started component.

After receiving the description file, the PostData interface of the bus module may transmit the description file to the data parsing/execution module (that is, perform step 3 in FIG. 3). The data parsing/execution module parses the description file based on the protocol specification and the protocol infrastructure, and checks normalization of the description file. After checking that the description file is normalized, the data parsing/execution module transmits data (for example, including standard key/value values in an identification block and a logical block in the description file, and further including component-related data, such as data in a body area in the description file) obtained through parsing to the data storage module (that is, performs step 4 in FIG. 3). The data storage module stores the received data. It should be noted that the data parsing/execution module does not parse the data in the body area in the description file, that is, component-defined data, but directly transmits the data to the data storage module for storage. In this case, interaction between the application and the bus module is completed.

If a corresponding function needs to be implemented in a run time of the application, the automatically started component runs. When the automatically started component runs, the automatically started component may perform real-time query on the data storage module of the bus module by using an interface such as PostData(json easygo) between the automatically started component and the bus module, to obtain component-defined data corresponding to the automatically started component. When running the device capability service provided by the component, the automatically started component may parse the obtained component-defined data, and provide the corresponding device capability service for the application, to implement the corresponding function.

For example, on some special displays such as a hypersurface display, if a displayed element included on an application interface is very close to an edge of the display, display distortion may occur, or a phenomenon of accidental touch by a user may occur. In such a scenario, the application developer may configure a description file in the application (for example, TOUTIAO), and the description file includes information indicating that the application needs to implement a margin adaptation function. With reference to FIG. 3, the margin adaptation function may be implemented by using a hypersurface adaptation service provided by a component A. In this way, when the application is installed, the description file may be transmitted to the bus module at the bus layer, to complete data interaction. Then, when the application runs, the component A runs, and queries data in the data storage module of the bus module, to obtain component-defined data corresponding to the component A (for example, performs step 5-1 in FIG. 3). When running the hypersurface adaptation service provided by the component A, the component A may parse the obtained component-defined data, and automatically adjust a margin based on a current interface of the application, to avoid display distortion of a displayed element close to an edge on the current interface of the application, and further avoid accidental touch by the user.

For another example, on some large-sized displays, if application pages may be displayed side by side, browsing and operating efficiency of the user can be improved. In such a scenario, the application developer may configure a description file in the application (for example, a shopping application such as AMAZON), and the description file includes information indicating that the application needs to implement a page side-by-side display function (for example, a store home page and a commodity details page are displayed side by side, or a commodity details page and a customer service page are displayed side by side) and information about pages suitable for being displayed side by side. With reference to FIG. 3, the page side-by-side display function may be implemented by using a large-screen adaptation service provided by a component B. In this way, when the application is installed, the description file may be transmitted to the bus module at the bus layer, to complete data interaction. Then, when the application runs, the component B runs, and queries data in the data storage module of the bus module, to obtain component-defined data corresponding to the component B, such as the information about pages suitable for being displayed side by side (for example, performs step 5-2 in FIG. 3). When running the large-screen adaptation service provided by the component B, the component B may parse the obtained component-defined data, and display corresponding pages of the application side by side based on a current interface of the application, to improve browsing and operating efficiency of the user.

With reference to FIG. 2, referring to FIG. 4, an interaction process of runtime interaction is as follows.

When the application runs, the application generates a corresponding description file based on a function to be implemented, and invokes the universal application layer interface of the bus module at the bus layer, such as the PostData interface, to transmit the generated description file to the bus module. For example, when the user taps on a menu in an application 1 to trigger the application to implement a movie ticket booking function, the application 1 may generate a corresponding description file based on the tap operation performed by the user on the menu, where the description file is used to indicate that a function that needs to be implemented by the application 1 is the movie ticket booking function, and transmit the description file to the universal application layer interface of the bus module, such as the PostData interface (that is, perform step 1-1 in FIG. 4). For example, the description file includes a "function": "movieTicket" field. For another example, when the user performs face unlock, a corresponding application of the electronic device, for example, referred to as an application 2, may generate a corresponding description file, where the description file is used to indicate that a function that needs to be implemented by the application 2 is a facial recognition function, and transmit the description file to the universal application layer interface of the bus module, such as the PostData interface (that is, perform step 1-2 in FIG. 4).

Figure 4:
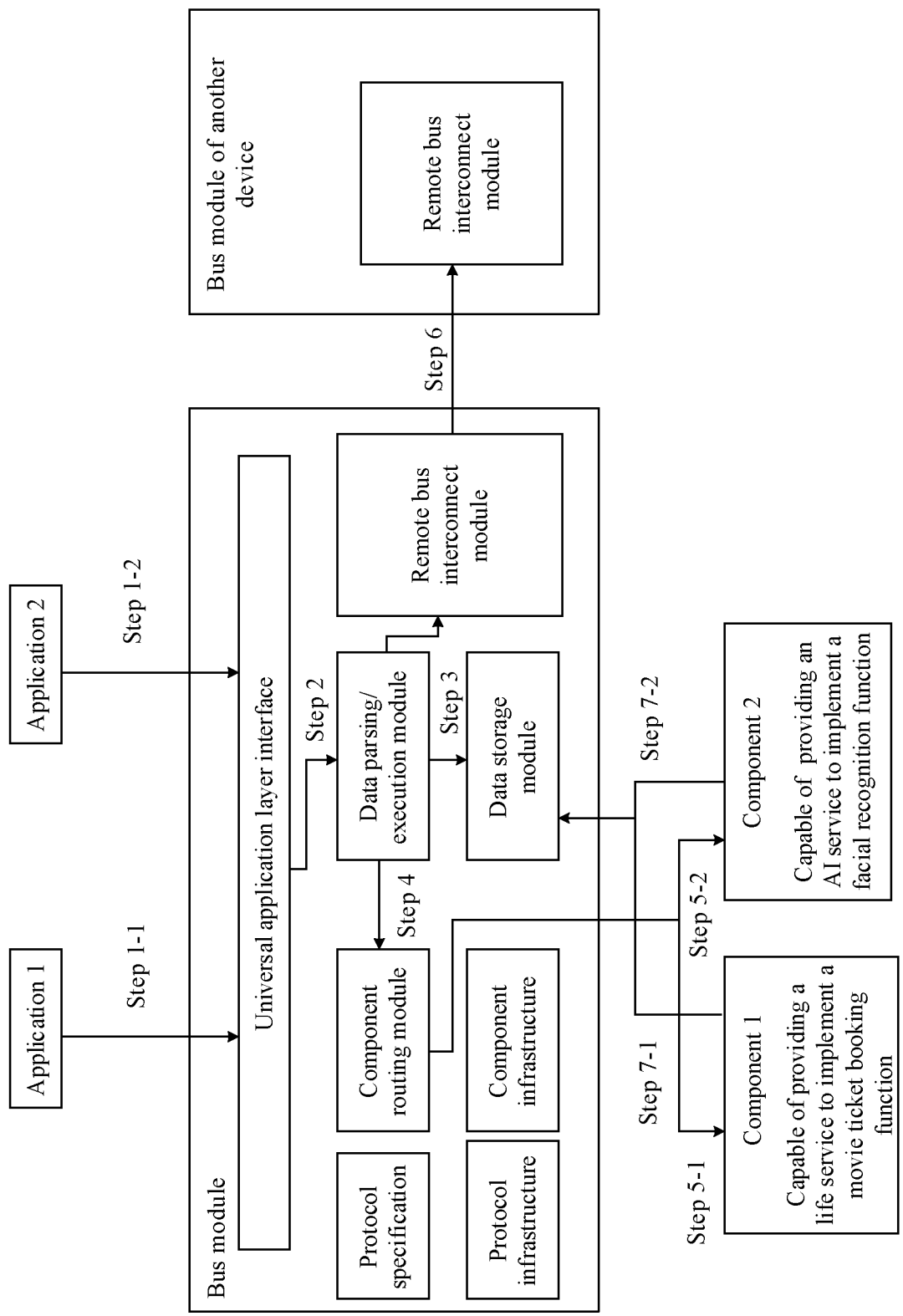
FIG. 4 is another schematic flowchart of non-intrusive interaction according to an embodiment of this application.

After receiving the description file, the universal application layer interface of the bus module, such as the PostData interface, may transmit the description file to the data parsing/execution module (that is, perform step 2 in FIG. 4). The data parsing/execution module parses the description file based on the protocol specification and the protocol infrastructure, and checks normalization of the description file. After checking that the description file is normalized, the data parsing/execution module transmits data (for example, including standard key/value values in an identification block and a logical block in the description file, and further including component-related data, such as data in a body area in the description file) obtained through parsing to the data storage module (that is, performs step 3 in FIG. 4). The data storage module stores the received data. It should be noted that the data parsing/execution module does not parse the data in the body area in the description file, that is, component-defined data, but directly transmits the data to the data storage module for storage.

After checking that the description file is normalized, the data parsing/execution module may further transmit data (for example, component-related data, such as data in a head area included in the logical block in the description file) obtained through parsing to the component routing module, to trigger the component routing module to perform routing (that is, perform step 4 in FIG. 4). When the electronic device is powered on, the bus module is automatically started, and scans all components of the electronic device based on the component infrastructure, and may further scan all components of another device if the electronic device establishes a connection to the other device, and store configuration information of all scanned components in the data storage module. In addition, in the electronic device, if there is a component that is not configured, for example, a component that provides an underlying system service is generally not configured, the component may automatically transmit corresponding information (for example, also referred to as configuration information) of the component to the bus module when the device is powered on, for component routing.

When performing component routing, the component routing module may search for a component that can provide a corresponding device capability service from the components at the component service layer based on the configuration information stored in the data storage module. In some embodiments, if the electronic device establishes a connection to another device, when performing component routing, the component routing module may first search for a component that can provide the corresponding device capability service from components of the local device. If there is a component that can provide the corresponding device capability service in the components of the local device, the component routing module indicates the component to start. For example, with reference to the foregoing example, the description file is used to indicate that the function that needs to be implemented by the application is the movie ticket booking function. The component routing module finds a component that can provide a life service, for example, referred to as a component 1, from the components of the local device, and the component 1 may be used to implement the movie ticket booking function. In this case, the component routing module indicates the component 1 to start (that is, performs step 5-1 in FIG. 4). For another example, with reference to the foregoing example, the description file is used to indicate that the function that needs to be implemented by the application is the facial recognition function. The component routing module finds a component that can provide an artificial intelligence (AI) service, for example, referred to as a component 2, from the components of the local device, and the component 2 may be used to implement the facial recognition function. In this case, the component routing module indicates the component 2 to start (that is, performs step 5-2 in FIG. 4).

If there is no component that can provide the corresponding device capability service in the components of the local device, the component routing module transmits, by using the remote bus interconnect module and based on the configuration information stored in the data storage module, the received description file to the other device connected to the device (for example, transmits the received description file to a remote bus interconnect module in a bus module of the other device, that is, performs step 6 in FIG. 4). The device includes a component that can provide the corresponding device capability service. After the description file is transmitted to the other device, the device parses and checks the description file again, triggers the component routing module to perform routing until a component that can provide the corresponding device capability service is found, and indicates the component to start.

When the component runs, the component may perform real-time query on the data storage module of the bus module by using an interface such as PostData(json easygo) between the component and the bus module, to obtain component-defined data corresponding to the component. When running the device capability service provided by the component, the component may parse the obtained component-defined data, and provide the corresponding device capability service for the application, to implement the corresponding function. For example, with reference to the foregoing example, when running, the component 1 queries the data storage module, to obtain component-defined data corresponding to the component 1 (that is, performs step 7-1 in FIG. 4). For another example, with reference to the foregoing example, when running, the component 2 queries the data storage module, to obtain component-defined data corresponding to the component 2 (that is, performs step 7-2 in FIG. 4).

The following uses an example in which the electronic device is a mobile phone to describe this embodiment based on different interaction manners (static interaction or run-time interaction) with reference to examples.

Example 1: With reference to FIG. 2, a component service layer of the mobile phone includes a split-screen component.

The split-screen component may provide a split-screen service to implement a split-screen display function. Further, in a process in which a user browses an application, the split-screen component may display pages of the application in split screens based on an activity feature of the application. The split-screen component may belong to the foregoing automatically started component. The interaction manner of static interaction may be used. In a non-run time of the application, the application completes interaction with a bus module at a bus layer. For example, for an application that needs to use the split-screen service provided by the split-screen component, an application developer may configure a corresponding description file and package the description file into an installation package of the application. When the application is installed, the description file is transmitted to the bus module at the bus layer. The bus module parses and checks the description file, and after checking that the description file is normalized, stores data obtained through parsing, for example, including standard key/value values in an identification block and a logical block in the description file, and further including component-related data (such as data in a body area in the description file). In this way, in a run time of the application, if a split-screen function needs to be implemented, the split-screen component runs, and reads and parses the stored data to provide the split-screen service for the application, thereby displaying pages of the application in split screens.

In some embodiments, the split-screen service provided by the split-screen component includes two split-screen display modes: a list mode and a non-list mode. The list mode is applicable to an information flow application, such as a news application. The non-list mode is applicable to a scenario in which a single product is displayed in a plurality of dimensions or in an associated mode in an application, and a scenario in which two products are compared in split screens, such as a shopping application.

Figure 5A:
FIG. 5A and FIG. 5B are a schematic diagram of a display interface according to an embodiment of this application.
Figure 5B:
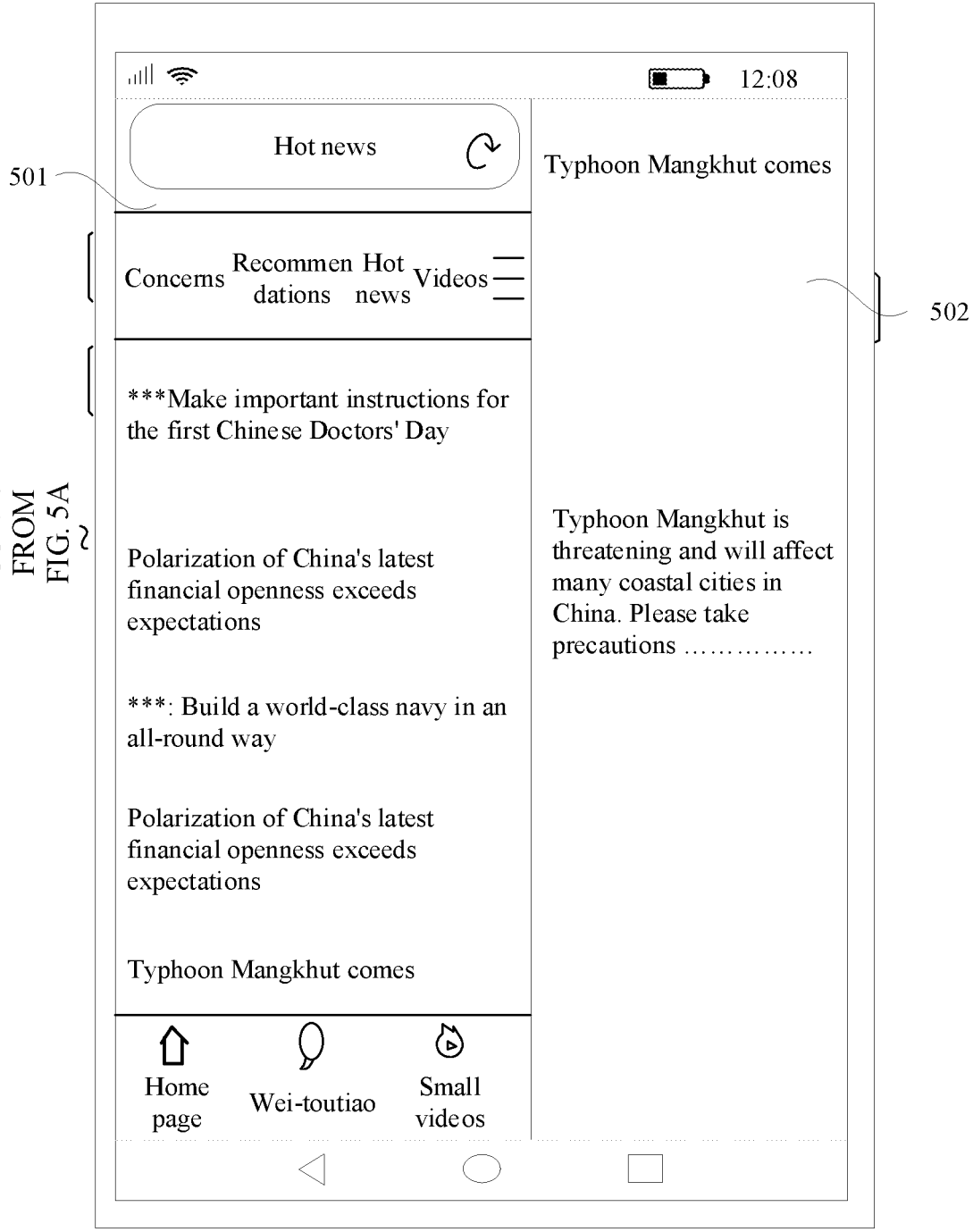

The list mode may include two modes: a single-list mode and a multi-list mode. For example, in the single-list mode, split-screen displaying of pages of an application may include display of the mobile phone is divided into a left display area and a right display area, a home page of the application is always displayed in the left display area, and another page of the application may be displayed in the right display area. For example, the application is TOUTIAO. When TOUTIAO is installed, a corresponding description file may be transmitted to the bus module, and the bus module parses and checks the description file. After checking that the description file is normalized, the bus module stores data obtained through parsing. As shown in FIG. 5A, after the user opens TOUTIAO, the mobile phone displays a home page 501 of TOUTIAO. When the user taps on an option on the home page to trigger displaying of another page, the split-screen component runs, and reads and parses the stored data to provide the split-screen service for TOUTIAO, thereby displaying pages of TOUTIAO in split screens. As shown in FIG. 5B, the mobile phone displays the home page 501 of TOUTIAO in a left area of the display, and displays another page 502 in a right area of the display. This display mode may assist the user in quick browsing. In addition, the split-screen component may further provide a service of exiting split-screen displaying. When the user wants to exit split-screen displaying, the user may perform a corresponding gesture to trigger exiting of split-screen displaying, so that discomfort of half-screen reading during long-content reading can be resolved. The user may trigger split-screen displaying of the mobile phone again by performing a corresponding mobile phone.

Figure 6A:
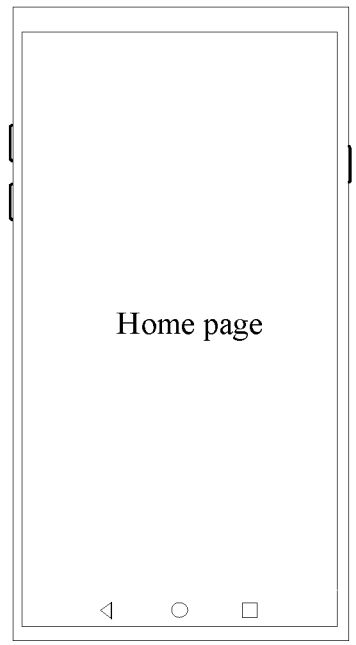
FIG. 6A, FIG. 6B, FIG. 6C, and FIG. 6D are a schematic diagram of another display interface according to an embodiment of this application.
Figure 6B:
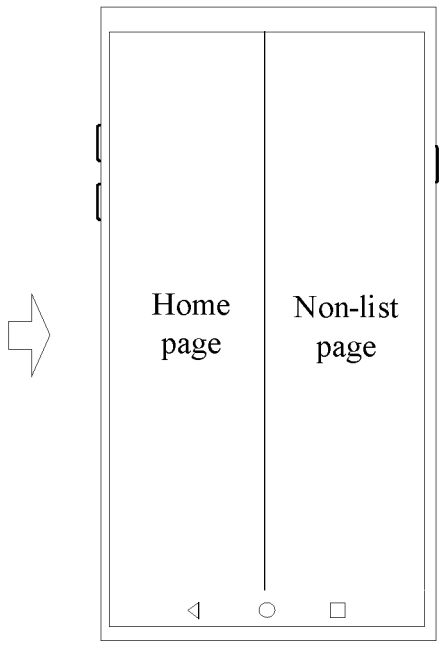
Figure 6C:
Figure 6D:
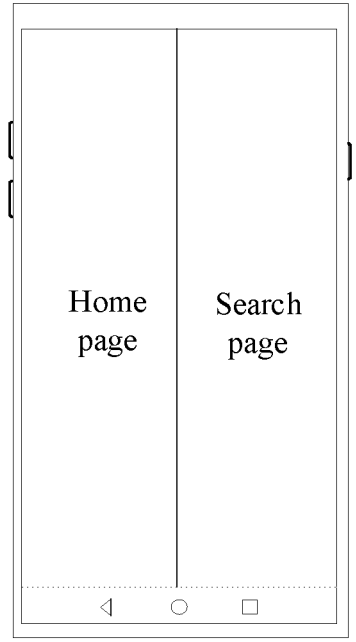

For another example, if an application has a plurality of list pages, such as a home page, a search page, and a recommendation page, activities carrying these list pages are all of a level 0, different list pages are carried by different activities, and activities carrying non-list pages are all of a level 1. For such an application, the multi-list mode may be used for split-screen displaying. With reference to FIG. 6A to FIG. 6D, split-screen displaying of pages of such an application may be, after the application is started, as shown in FIG. 6A, the mobile phone displays a home page of the application in full screen. If the user taps on an option on the home page to trigger displaying of a non-list page, as shown in FIG. 6B, the mobile phone divides the display into a left display area and a right display area, the home page is displayed in the left area, and the non-list page is displayed in the right area. If the user taps on an option on the home page to trigger displaying of another list page such as a recommendation page, as shown in FIG. 6C, the mobile phone displays the recommendation page in full screen. If the user taps on an option on the home page in the split-screen displaying shown in FIG. 6B to trigger displaying of another list page such as a search page, as shown in FIG. 6D, the mobile phone displays the home page in the left area, and displays the search page in the right area. In addition, the split-screen component may further provide a service of exiting split-screen displaying. In split-screen displaying scenarios shown in FIG. 6C and FIG. 6D, when the user wants to exit split-screen displaying, the user may perform a corresponding gesture to trigger exiting of split-screen displaying. The user may trigger split-screen displaying of the mobile phone again by performing a corresponding mobile phone. This display mode may avoid frequent switching between split-screen displaying and full-screen displaying.

For an application to which split-screen displaying in the non-list mode is applicable, split-screen displaying may be performed based on a rule of simultaneously displaying related activities. A shopping application is used as an example. Related activities may include an activity carrying a details page of a commodity, an activity carrying a customer service page of the commodity, an activity carrying a comment page of the commodity, and an activity carrying a details page of a commodity similar to the commodity.

Figure 7:
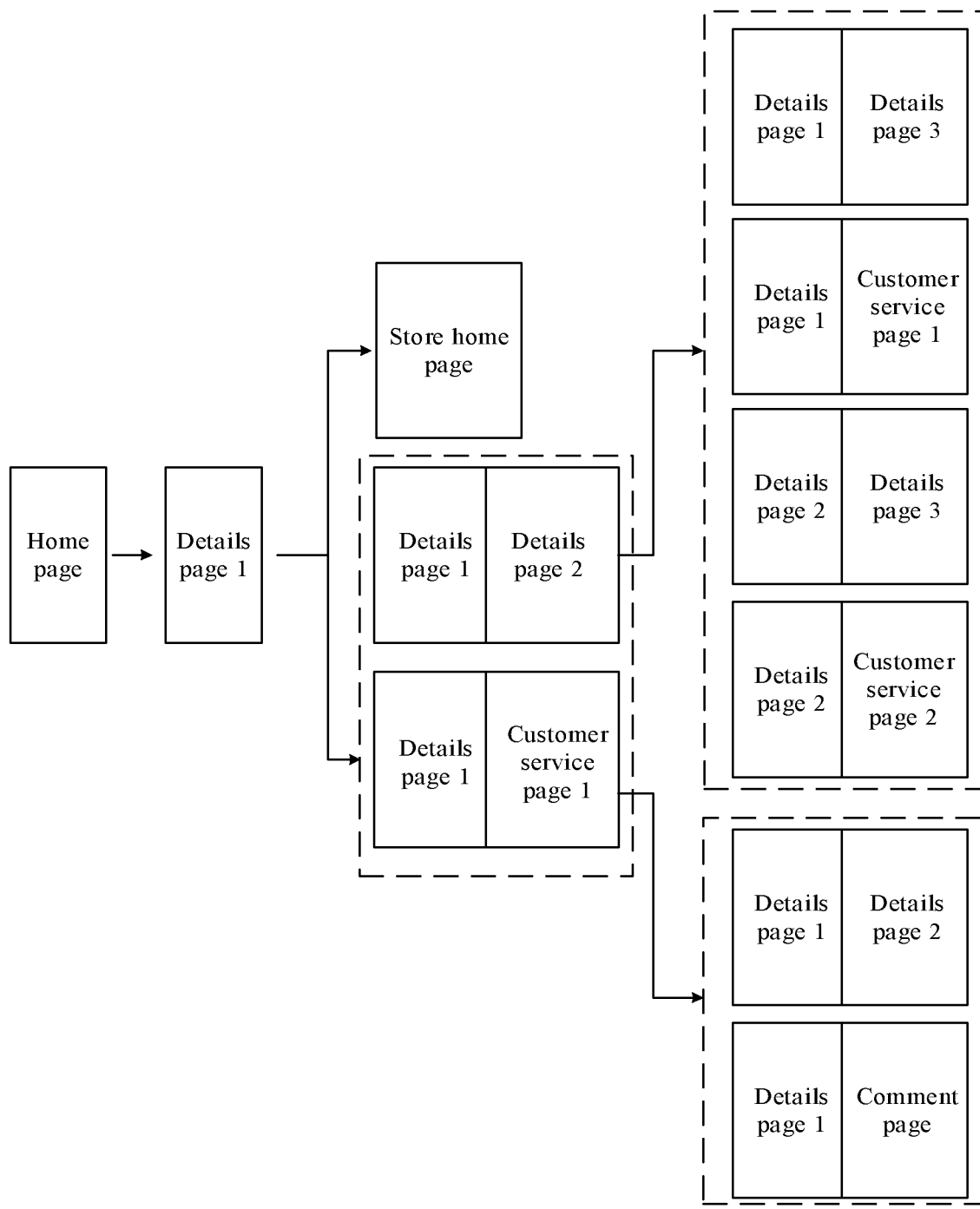
FIG. 7 is a schematic diagram of still another display interface according to an embodiment of this application.

For example, referring to FIG. 7, split-screen displaying of pages of the shopping application may be, after the application is started, the mobile phone may display a home page of the application in full screen. If the user taps on an option on the home page to trigger displaying of a details page of a commodity, for example, referred to as a details page 1, the mobile phone may display the details page 1 in full screen. If the user taps on an option on the details page 1 to trigger displaying of a store home page, the mobile phone displays the store home page in full screen. If the user taps on an option on the details page 1 to trigger displaying of a details page of a commodity related to the commodity, for example, referred to as a details page 2, the mobile phone divides the display into a left display area and a right display area, the details page 1 is displayed in the left area, and the details page 2 is displayed in the right area. If the user taps on an option on the details page 1 to trigger displaying of a customer service page of the commodity, for example, referred to as a customer service page 1, the mobile phone divides the display into a left display area and a right display area, the details page 1 is displayed in the left area, and the customer service page 1 is displayed in the right area.

When the mobile phone displays the details page 1 in the left area and displays the details page 2 in the right area, if the user taps on an option on the details page 1 to trigger displaying of a details page of a commodity related to the commodity, for example, referred to as a details page 3, the details page 1 continues to be displayed in the left area, and the details page 3 is displayed in the right area. If the user taps on an option on the details page 1 to trigger displaying of a customer service page of the commodity, for example, referred to as a customer service page 1, the details page 1 continues to be displayed in the left area, and the customer service page 1 is displayed in the right area. If the user taps on an option on the details page 2 to trigger displaying of a details page of a commodity related to the commodity, for example, referred to as a details page 3, the details page 2 is displayed in the left area, and the details page 3 is displayed in the right area. If the user taps on an option on the details page 2 to trigger displaying of a customer service page of the commodity, for example, referred to as a customer service page 2, the details page 2 is displayed in the left area, and the customer service page 2 is displayed in the right area.

When the mobile phone displays the details page 1 in the left area and displays the customer service page 1 in the right area, if the user taps on an option on the details page 1 to trigger displaying of a details page of a commodity related to the commodity, for example, referred to as a details page 2, the details page 1 continues to be displayed in the left area, and the details page 2 is displayed in the right area. If the user taps on an option on the details page 1 to trigger displaying of a comment page of the commodity, the details page 1 continues to be displayed in the left area, and the comment page is displayed in the right area.

In this example, the following provides an example of a description file:

for setting an activity level. In a run time of the application, if the split-screen function needs to be implemented, the stored data is read and parsed to provide the split-screen service for the application, thereby displaying pages of the application in split screens.

Example 2: With reference to FIG. 2, component service layers of the mobile phone and a smart sound box each include an audio playing component, and a connection is established between the mobile phone and the smart sound box. The audio playing component may provide an audio playing service to implement an audio playing function. For example, an audio playing component function of the mobile phone is phoneMusicPlay, and an audio playing component function of the smart sound box is boxMusicPlay. When the user starts a music player to play music, the following logic is intended to be implemented. To play a piece of music, the audio playing service provided by the audio playing component is used to implement the audio playing function, and the smart sound box is preferred. In this scenario, because music playing is triggered by the user, the interaction manner of runtime interaction may be used. When the music player runs, the application completes interaction with a bus module at a bus layer.

For example, the user opens the music player on the mobile phone, and taps on a piece of music that needs to be played. In response to the operation of the user, the music player may generate the following description file and transmit the description file to the bus module at the bus layer. The bus module parses and checks the description file, and through parsing, the bus module learns that a boxMusicPlay audio playing component is preferred. The bus module searches the local device, that is, the mobile phone, for the boxMusicPlay audio playing component, but does not find the boxMusicPlay audio playing component. The

```xml
<?xml version="1.0" encoding="utr-8"?>
<hwEasyGo version="1.0">
    <client package="com.xxx.xxx"/>         <!--Identification block-package name-->
    <signInfo value="xxxx"/>                 <!--Identification block-signature, to ensure data integrity-->
    <logicEntities>                          <!--Logical block-->
        <entity>                             <!--Logical block-entity 1-- >
            <head>                           <!--Logical block-entity 1-head area, which is a universal field-->
                <function name="magicWindowAdapter"/>
            </head>
            <body>                           <!--Logical block-entity 1-body area, corresponding to self-defined data of a function-->
                <windowMode value="2">       <!--Self-defined field 1: 2 indicates that a screen split is supported, and 3 indicates that single-screen displaying is always used-->
                <switchType value="1">       <!--Self-defined field 2: 0 indicates the list mode, 1 indicates the non-list mode, and 2 indicates a universal switching mode-->
                <activityLevel>              <!--Self-defined field 3: sets an activity level-->
                    <activity level="0" name="com.xxx.xxx.MainActivity">
                    <activity level="0" name="com.xxx.xxx.SearchActivity">
                    <activity level="0" name="com.xxx.xxx.DetailActivity">
                    <activity level="1" name="com.xxx.xxx.ChatActivity">
                </activityLevel>
            </body>
        </entity>
    </logicEntities>
</hwEasyGo>.
```

When the application is installed, the bus module may obtain the description file, and parse and check the description file. After checking that the description file is normalized, the bus module stores data obtained through parsing, for example, including data <windowMode value="2"> indicating that a screen split is supported, data <switchType value="1"> indicating a split-screen display mode, and data bus module transmits the description file to a bus module of the smart sound box. Through parsing, the bus module of the smart sound box learns that the boxMusicPlay audio playing component is preferred, and may further store data in a body area. The bus module of the smart sound box finds the boxMusicPlay audio playing component in the local device, and starts the boxMusicPlay audio playing component. The boxMusicPlay audio playing component runs, and reads and parses the stored data in the body area, to provide an audio playing service for the music player to play music:

```
{
    "EasyGoVersion":"1.0",          //Version number of Huawei fast access protocol
    "client":"com.xxx.music",       //Identifier of an accessed third-party application
    "signInfo":"ALSJFS32KAD9OFJ2SAD",   //Signature
    "logicEntities":                //Logical block: running logical entities
    "or": {                         //Condition keyword: "or" indicates that one entity is selected from an entity set in sequence for execution; "all" indicates that all entities are executed
        {
        "head": {
            "function":"boxMusicPlay"   //Unique identifier of a function component
            "required":"ture"
        }
        "body":{                    //Logical block: a body area, which is a self-defined key and is parsed by the component during running
            "musicPath":"http://xxx.yyy.mp4",      //Path of played music
        }
    },
        {
    "head": {
        "function":"phoneMusicPlay"
        "required":"ture",
    }
    "body": {
        "musicPath":"http://xxx.yyy.mp4",          //Path of played music
        }
        }
        }
    }
}.
```

According to some other embodiments of this application, an electronic device is further provided, and is configured to perform the method in the foregoing embodiments, to implement functions of the electronic device in the foregoing embodiments. The electronic device may include a display, one or more processors, and a memory. The foregoing components may be connected through one or more communication buses. The memory stores one or more pieces of computer program code, the one or more pieces of computer program code include computer instructions, and the one or more processors are configured to execute the computer instructions, and may be configured to implement behavioral functions of the electronic device in the foregoing embodiments.

According to some other embodiments of this application, a computer-readable storage medium is further provided. The computer-readable storage medium may include computer software instructions. When the computer software instructions are run on an electronic device, the electronic device is enabled to perform the steps performed by the electronic device in the foregoing embodiments.

According to some other embodiments of this application, a computer program product is further provided. When the computer program product runs on a computer, the computer is enabled to perform the steps performed by the electronic device in the foregoing embodiments.

According to some other embodiments of this application, an apparatus is further provided. The apparatus has a function of implementing behavior of the electronic device in the foregoing embodiments. The function may be implemented by hardware, or may be implemented by corresponding software executed by hardware. The hardware or the software includes one or more modules corresponding to the foregoing function, for example, an obtaining unit or module, a determining unit or module, and a running unit or module.

According to some other embodiments of this application, a chip system is further provided. The chip system may be used in an electronic device. The chip system includes an interface circuit and a processor. The interface circuit and the processor are interconnected through a line. The interface circuit is configured to receive a signal from a memory of the electronic device, and send the signal to the processor. The signal includes computer instructions stored in the memory. When the processor executes the computer instructions, the chip system performs the steps performed by the electronic device in the foregoing embodiments.

The electronic device, the computer-readable storage medium, the computer program product, the apparatus, and the chip system provided in the embodiments of this application may perform actions of the electronic device in the foregoing embodiments. Implementation principles and technical effects thereof are similar, and details are not described herein again.

The foregoing description about the implementations allows a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may be one or more physical units, that is, may be located in one place, or may be distributed on a plurality of different places. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a USB flash drive, a removable hard disk, a read-only memory (ROM), a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A non-intrusive interaction method comprising:
    obtaining a description file of an application, wherein the description file indicates a function to be implemented by the application, and wherein the description file is defined based on a non-intrusive protocol description;
    determining, based on the description file, a first component of an electronic device to implement the function, wherein the first component provides a device capability service based on a non-intrusive protocol and implements an independent function; and
    running, based on the description file to provide the device capability service for the application, the first component to implement the function.

2. The non-intrusive interaction method of claim 1, wherein the description file comprises:
    an identification block comprising the following first fields: a non-intrusive protocol version number followed by the description file, an identifier of the application, and a signature of the application; and
    a logical block comprising one or more single logical entities, wherein a single logical entity in the logical block indicates a running instance of the first component, wherein the single logical entity comprises a head area, and wherein the head area comprises a second field identifying the first component to implement the function,
    wherein the non-intrusive interaction method further comprises:
        checking, based on the first fields and the second field, normalization of the description file; and
        further determining, based on the second field, the first component when the checking normalization of the description file has succeeded.

3. The non-intrusive interaction method of claim 2, wherein the single logical entity further comprises a body area, wherein the body area comprises a third field for data for the first component to implement the function, and wherein the non-intrusive interaction method further comprises further running, based on the third field to provide the device capability service, to implement the function.

4. The non-intrusive interaction method of claim 3, further comprising:
    obtaining a preconfigured description file during a non-run time of the application;
    parsing the preconfigured description file;
    storing the first fields, the second field, and the third field;
    reading, during a run time of the application, the third field;
    parsing the third field to obtain a parsing result; and
    further running, based on the parsing result to provide the device capability service, the first component to implement the function.

5. The non-intrusive interaction method of claim 3, further comprising:
    generating the description file when the application is running;
    parsing the description file;
    storing the first fields, the second field, and the third field;
    reading the third field;
    parsing the third field to obtain a parsing result; and
    further running, based on the parsing result to provide the device capability service, the first component to implement the function.

6. The non-intrusive interaction method of claim 1, further comprising:
    storing first configuration information of a second set of components of the electronic device, wherein the second set of components comprise the first component; and
    further determining, based on the first configuration information, the first component.

7. The non-intrusive interaction method of claim 6, further comprising:
    further storing second configuration information of a third set of components of a device that establishes a wireless connection to the electronic device;
    determining, based on the second configuration information, that there is a fourth component to implement the function in the third set of components; and
    transmitting, in response to the determination, the description file to the device to enable the device to determine and run a corresponding component, provide the device capability service, and implement the function.

8. The method of claim 1, wherein the non-intrusive protocol is JavaScript Object Notation (JSON).

9. An electronic device comprising:
a memory storing instructions; and
a processor coupled to the memory, wherein when executed by the processor, the instructions cause the electronic device to:
obtain a description file of an application, wherein the description file indicates a function to be implemented by the application, and wherein the description file is defined based on a non-intrusive protocol description;
determine, based on the description file, a first component of the electronic device to implement the function, wherein the first component provides a device capability service based on a non-intrusive protocol and implements an independent function; and
run, based on the description file to provide the device capability service for the application, the first component to implement the function.

10. The electronic device of claim 9, wherein the description file comprises:
an identification block comprising the following first fields: a non-intrusive protocol version number followed by the description file, an identifier of the application, and a signature of the application; and
a logical block comprising one or more single logical entities, wherein a single logical entity in the logical block indicates a running instance of the first component, wherein the single logical entity comprises a head area, and wherein the head area comprises a second field identifying the first component to implement the function,
wherein when executed by the processor, the instructions further cause the electronic device to:
check, based on the first fields and the second field, normalization of the description file; and
further determine, based on the second field, the first component when the check normalization of the description file has succeeded.

11. The electronic device of claim 10, wherein the single logical entity further comprises a body area, wherein the body area comprises a third field used for data for the first component to implement the function, and wherein when executed by the processor, the instructions further cause the electronic device to further run, based on the third field to provide the device capability service, to implement the function.

12. The electronic device of claim 11, wherein when executed by the processor, the instructions further cause the electronic device to:
obtain a preconfigured description file during a non-run time of the application;
parse the preconfigured description file;
store the first fields, the second field, and the third field;
read, during a run time of the application, the third field;
parse the third field to obtain a parsing result; and
further run, based on the parsing result to provide the device capability service, to implement the function.

13. The electronic device of claim 11, wherein when executed by the processor, the instructions further cause the electronic device to:
generate the description file when the application is running;
parse the description file;
store the first fields, the second field, and the third field;
read the third field;
parse the third field to obtain a parsing result; and
run, based on the parsing result to provide the device capability service, the first component to implement the function.

14. The electronic device of claim 11, wherein when executed by the processor, the instructions further cause the electronic device to:
store, in the memory, first configuration information of a second set of components of the electronic device, wherein the second set of components comprise the first component; and
further determine, based on the description file and the first configuration information, the first component.

15. The electronic device of claim 14, wherein when executed by the processor, the instructions further cause the electronic device to:
further store, in the memory, second configuration information of a third set of components of a device that establishes a wireless connection to the electronic device;
determine, based on the second configuration information, that there is a fourth component to implement the function in the third set of components; and
transmit the description file to the device to enable the device to determine and run a corresponding component to provide the device capability service and implement the function.

16. The electronic device of claim 9, wherein the non-intrusive protocol is JavaScript Object Notation (JSON).

17. A computer program product comprising computer-executable instructions that are stored on a non-transitory computer-readable medium and that, when executed by a processor, cause an electronic device to:
obtain a description file of an application, wherein the description file indicates a function to be implemented by the application, and wherein the description file is defined based on a non-intrusive protocol description;
determine, based on the description file, a first component of the electronic device to implement the function, wherein the first component provides a device capability service based on a non-intrusive protocol and implements an independent function; and
run, based on the description file to provide the device capability service for the application, the first component to implement the function.

18. The computer program product of claim 17, wherein the description file comprises:
an identification block comprising the following first fields: a non-intrusive protocol version number followed by the description file, an identifier of the application, and a signature of the application; and
a logical block comprising one or more single logical entities, wherein a single logical entity in the logical block indicates a running instance of the first component, wherein the single logical entity comprises a head area, and wherein the head area comprises a second field identifying the first component to implement the function; and
wherein the computer-executable instructions further cause the electronic device to:
check, based on the first fields and the second field, normalization of the description file; and
further determine, based on the second field, the first component when the check normalization of the description file has succeeded.

19. The computer program product of claim 18, wherein the single logical entity further comprises a body area, wherein the body area comprises a third field used for data for the first component to implement the function, and wherein the computer-executable instructions further cause the electronic device to further run based on the third field to provide the device capability service, to implement the function.

20. The computer program product of claim 19, wherein the computer-executable instructions further cause the electronic device to:
   obtain a preconfigured description file during a non-run time of the application;
   parse the preconfigured description file;
   store the first fields, the second field, and the third field;
   read during a run time of the application, the third field;
   parse the third field to obtain a parsing result; and
   further run, based on the parsing result to provide the device capability service, the first component to implement the function.

* * * * *

UNITED STATES PATENT AND TRADEMARK OFFICE
CERTIFICATE OF CORRECTION

| | | |
|---|---|---|
| PATENT NO. | : 12,019,531 B2 | Page 1 of 1 |
| APPLICATION NO. | : 17/688025 | |
| DATED | : June 25, 2024 | |
| INVENTOR(S) | : Jianfeng Wang et al. | |

It is certified that error appears in the above-identified patent and that said Letters Patent is hereby corrected as shown below:

On the Title Page

(71) Applicant: "Huawei Device Co., Ltd., Guangdong (CN)" should read "Huawei Device Co., Ltd., Dongguan (CN)"

Signed and Sealed this
Sixth Day of August, 2024

Katherine Kelly Vidal
*Director of the United States Patent and Trademark Office*